United States Patent [19]

Singh et al.

[11] 4,366,307
[45] Dec. 28, 1982

[54] LIQUID POLYTHIOETHERS

[75] Inventors: Hakam Singh, Arcadia; Jack W. Hutt, Tarzana; Morris E. Williams, Van Nuys, all of Calif.

[73] Assignee: Products Research & Chemical Corp., Glendale, Calif.

[21] Appl. No.: 248,994

[22] Filed: Mar. 30, 1981

Related U.S. Application Data

[63] Continuation-in-part of Ser. No. 213,173, Dec. 4, 1980, abandoned, and Ser. No. 231,319, Feb. 4, 1981, abandoned.

[51] Int. Cl.$^3$ .............................................. C08G 75/00
[52] U.S. Cl. ........................................ 528/373; 568/44; 568/45; 568/46
[58] Field of Search ................... 528/373; 568/44, 45, 568/46

[56] References Cited

U.S. PATENT DOCUMENTS

| | | | |
|---|---|---|---|
| 3,951,927 | 4/1976 | Aloia | 528/373 |
| 3,985,708 | 10/1976 | Chang et al. | 528/373 |
| 4,000,213 | 12/1976 | Chang | 260/37 EP |
| 4,028,305 | 6/1977 | Li et al. | 260/40 R |
| 4,089,905 | 5/1978 | Singh | 568/46 |
| 4,089,906 | 5/1978 | Singh et al. | 568/46 |
| 4,091,002 | 5/1978 | Li | 260/40 R |
| 4,093,599 | 6/1978 | Aloia | 568/47 |
| 4,094,859 | 6/1978 | Chang | 568/46 |
| 4,202,963 | 5/1980 | Behrens | 528/373 |
| 4,217,215 | 8/1980 | Panzer | 528/373 |
| 4,217,443 | 8/1980 | Panzer | 528/373 |
| 4,218,559 | 8/1980 | Maulding et al. | 528/389 |

*Primary Examiner*—Melvyn I. Marquis
*Attorney, Agent, or Firm*—Poms, Smith, Lande & Rose

[57] ABSTRACT

A non-crystallizing, water, solvent, fuel and temperature resistant liquid polythioether having two to four terminating radicals which do not substantially reduce the water, solvent, fuel and temperature resistance and a water, solvent, fuel and temperature resistant polymeric backbone having repeating units of the formula:

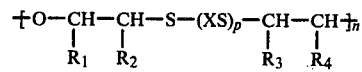

wherein each of $R_1$, $R_2$, $R_3$ and $R_4$ is hydrogen or lower alkyl providing that a sufficient number of $R_1$, $R_2$, $R_3$ and/or $R_4$ are lower alkyl in said polymeric backbone to render said backbone non-crystallizing; X is a divalent organic radical selected from $-CH_2-CH_2-$, $-CH_2-CH_2-CH_2-CH_2-$, $-CH_2-CH_2-S-CH_2-CH_2-$ or $-CH_2-CH_2-O-CH_2-CH_2-$; n is 8 to 200; and p is 0 or 1.

101 Claims, No Drawings

LIQUID POLYTHIOETHERS

CROSS-REFERENCE TO RELATED APPLICATIONS

This application is a continuation-in-part of copending application Ser. No. 213,173 filed on Dec. 4, 1980 and copending application Ser. No. 231,319 filed on Feb. 4, 1981 both now abandoned.

BACKGROUND OF THE INVENTION

There are not many liquid polymers available in the marketplace today which have good fuel, solvent, water and temperature resistance. Of those liquid polymers available in the marketplace, many are relatively expensive and the remainder have other disadvantages.

Certain prior art workers have made hydroxyl terminated polythioethers by condensing thiodiglycol in the presence of certain etherifying catalysts as, for example, shown in U.S. Pat. Nos. 3,312,743 and 3,335,189. Compounds produced by these patents give semi-crystalline waxy solids, gums or low molecular weight liquids which have limited commercial utility.

Copolymerization of thiodiglycol with dihydric alcohols is disclosed in U.S. Pat. Nos. 3,005,803; 3,985,708 and 4,093,599. Due to the fact that the hydroxyl groups on the dihydric alcohols have lower activity towards condensation than the hydroxyl groups on thiodiglycol the condensation is irregular and/or incomplete which causes the reaction product to have a very wide molecular weight distribution which is undesirable. Just as importantly, the dihydric alcohols are non-sulfur containing and therefore incorporation of these non-sulfur containing monomers in the polymer backbone significantly reduces the solvent and fuel resistance of the resulting polymer.

In addition to the foregoing deficiencies with the previously known polythioethers, the prior art polythioethers are also crystallizing products which, even if liquid or semi-liquid at ambient temperatures, when they are cooled sufficiently to solidify will not return to their previous liquid state even when the temperature is raised to ambient.

SUMMARY OF THE INVENTION

It is therefore the primary object of the present invention to disclose and provide liquid, non-crystallizing polythioethers having a water, solvent, fuel and temperature resistant backbone.

It is a further object of the present invention to disclose and provide relatively high molecular weight liquid polythioethers which are water, solvent, fuel and temperature resistant.

It is still another object of the present invention to embody liquid, non-crystallizing polythioethers which have a water, solvent, fuel and temperature resistant backbone with varying end groups which make them useful for a wide variety of applications.

Still a further object of the present invention is to disclose liquid, non-crystallizing polythioethers which have a water, solvent, fuel and temperature resistant backbone and terminating chemically non-reactive radicals.

Another and further object of the present invention is to disclose and provide liquid, non-crystallizing polythioethers which are vulcanizable to elastomers which are water, solvent, fuel and temperature resistant and exhibit elastomeric properties over a wide range of temperature.

It is still another object of the present invention to disclose vulcanized solid elastomers which are water, solvent, fuel and temperature resistant.

These and other objects of the present invention, which will be apparent to the art-skilled, are accomplished by providing a non-crystallizing, water, solvent, fuel and temperature resistant linear or branched polymeric backbone having repeating units or groups of the formula

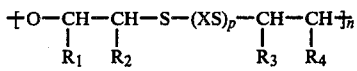

wherein X is a radical consisting of —$CH_2$—$CH_2$—$CH_2$—$CH_2$—, —$CH_2$—$CH_2$—,—$CH_2$—$CH_2$—S—$CH_2$—$CH_2$—, or —$CH_2$—$CH_2$—O—$CH_2$—$CH_2$—; n is from 8 to 200; p is 0 or 1; and each of $R_1$, $R_2$, $R_3$ and $R_4$ is hydrogen or lower alkyl (preferably methyl) with the provision that the total number of $R_1$, $R_2$, $R_3$ and/or $R_4$ which are lower alkyl in said polymeric backbone is sufficient to render said backbone non-crystallizing. In general it may be said that the total number of $R_1$, $R_2$, $R_3$ and/or $R_4$ which are lower alkyl in said polymeric backbone is at least the nearest whole number to the quotient of n/5, preferably n/4. In other words, in the case of n/4, when n is 8 at least two of $R_1$, $R_2$, $R_3$ or $R_4$ would be lower alkyl in the polymeric backbone. On the other hand when n is, for example, 200 at least about 50 of $R_1$, $R_2$, $R_3$ and/or $R_4$ would be lower alkyl in the polymeric backbone which could be accomplished (1) by having $R_1$ and $R_4$ both lower alkyl in at least about 12% to 13% of the units or groups or (2) by having $R_1$ lower alkyl in at least about 25% of the units or groups. In all of the foregoing exemplary cases the resulting polymeric backbone is non-crystallizing.

The polymeric backbone may be terminated with any type of terminating radical providing that said radical does not substantially reduce the water, solvent, fuel and temperature resistance of the liquid polythioether polymer. The number of such terminating radicals on the non-crystallizing liquid polythioether conveniently ranges from 2 to 4 but may be higher than 4 depending on the molecular weight and branching of the polymer. Such terminating radicals include vulcanizable radicals, for example room or low temperature vulcanizable radicals, as well as chemically non-reactive radicals. In the case of non-crystallizing liquid polythioethers having terminating vulcanizable radicals such liquid polythioethers may be cured or vulcanized to solid polythioether elastomers which are water, solvent, fuel and temperature resistant and exhibit elastomeric properties over a wide range of temperatures. In the case of those non-crystallizing liquid polythioethers having terminating chemically non-reactive radicals, such liquid polythioethers may be used as plasticizers, dielectric fluids, high temperature lubricants and non-curing sealants.

Whatever the use of the non-crystallizing liquid polythioethers of this invention, they will in general have a molecular weight of at least about 900 to as high as about 25,000, the particular molecular weight desired being a matter of choice.

It should be noted that by "non-crystallizing" we mean a polymer which is liquid at ambient and is not a semi-crystalline wax, gum or solid. Moreover, the non-crystallizing polymer, even when cooled to a sufficiently low temperature to become a solid, will be an amorphous solid which, when the temperature is raised to ambient, will return to the liquid state.

DESCRIPTION OF THE PREFERRED EMBODIMENTS

In general the liquid polythioethers of the present invention will be made by condensing one or more beta-thioether diols. By "beta-thioether diol" we mean a thioether diol wherein each hydroxyl group in the diol is located beta to a sulfur atom, i.e. each hydroxyl group will be separated from a sulfur atom by two carbon atoms. A certain percentage, ranging up to 100 mole %, of the starting beta-thioether diols will have at least one (preferably one or two) branched lower alkyl, i.e. there will be a lower alkyl group (preferably a methyl group) attached to at least one of the two carbon atoms separating the sulfur and hydroxyl groups so that at least one of said hydroxyl groups will have a lower alkyl group located alpha or beta to said hydroxyl group. Hereinafter such beta-thioether diols will be referred to as "substituted beta-thioether diols".

The substituted beta-thioether diol may be the only beta-thioether diol used in the condensation reaction which produces the liquid polythioether backbone but there may also be used an "unsubstituted beta-thioether diol" by which we mean a beta-thioether diol wherein the two carbon atoms separating the sulfur and hydroxyl groups are unsubstituted, i.e. have the structure of HO—CH$_2$—CH$_2$—S—. The preferred unsubstituted beta-thioether diol is thiodiglycol, bis (beta-hydroxyethyl) sulfide.

As noted the amount of substituted beta-thioether diol in the condensation reaction may be 100% but may be less. However, the least amount of substituted beta thioether diol which may be used must be sufficient to render the resulting liquid polythioether non-crystallizing. In general, the number of branched alkyls present in the liquid polythioether will be the quotient of n/5 or, preferably, n/4 where n has the same meaning as before. Therefore, where there is only one branched alkyl per substituted beta-thioether diol there should be present at least 20 or 25 mole % substituted beta-thioether diol in the condensation reaction and where there are two branched alkyls per substituted beta-thioether diol there should be present at least about 10 to 13 mole % of substituted beta-thioether diol in the condensation reaction.

As has been noted before, the liquid polythioethers of the present invention may be either linear or branched. In order to provide a linear polythioether all that is necessary is to condense the beta-thioether diols referred to above. In this case a non-crystallizing water, solvent, fuel and temperature resistant linear polymeric backbone is formed having two terminating hydroxyl groups or radicals thereon, such terminating hydroxyl groups being terminating vulcanizable groups. The resulting linear liquid polythioether having the two terminating hydroxyl radicals may be vulcanized to a solid elastomer at either low or high temperatures.

As will be explained in greater detail, if other terminating radicals, such as terminating vulcanizable radicals, are desired they may be added by including a condensable organic compound having a terminating radical in the initial condensation reaction with the beta-thioether diol. Alternatively, other terminating radicals, including terminating chemically non-reactive radicals as well as terminating vulcanizable radicals, may be added after formation of the hydroxyl terminated linear liquid polythioether by reacting such linear polythioether with an organic compound having the required terminating radicals as well as radicals reactive with hydroxyl groups.

To have a branched liquid polythioether there should also be used as a starting material in the condensation reaction of the beta-thioether diols an organic triol or tetrol of the formula R(OH)$_m$ where m is 3 or 4 and R is any tri-or tetravalent organic radical having no groups reactive with hydroxyl radicals. It is preferred that such triol or tetrol have a molecular weight less than 400 and more preferable that the molecular weight be less than 360. R is preferably aliphatic sulfide or hetero aliphatic sulfide and more preferably alkyl sulfide or hetero alkyl (e.g. oxyalkyl) sulfide, the number of sulfur atoms ranging from 2 to 6 and preferably from 2 to 4. R will, in general, also have from 6 to 16 carbon atoms. The amount of organic triol or tetrol used is not particularly critical. In general it may be said that the amount of organic triol or tetrol used will be between about 0.1 mole % to 5 mole % based on the total moles of beta-thioether diol.

In order to have complete condensation between the beta-thioether diols and all of the hydroxyl groups on the organic triol or tetrol and thereby have a relatively high molecular weight branched liquid polythioether with substantially uniform chain lengths it is believed necessary that the organic triol or tetrol be a beta-thioether triol or tetrol, the term "beta-thioether" having the same meaning as previously defined for the term "beta-thioether diol". In other words, each hydroxyl group in the beta-thioether triol or tetrol should be separated from a sulfur atom by two carbon atoms so that the reactivity of the hydroxyl groups in the beta-thioether triol or tetrol is substantially the same as the reactivity of the hydroxyl groups in the beta-thioether diol. Additionally, since the beta-thioether triol or tetrol contains sulfur there is little, if any, loss of fuel and/or solvent resistance in the resulting branched or polyfunctional liquid polythioether of the present invention.

It should be noted that when we speak of a branched polymer having a functionality of 3 or 4, we mean the polymer per se and not the mixture of polymers formed by the condensation reaction. In practice, the condensation reaction between the beta-thioether diol and organic triol and/or tetrol will, depending on the relative amounts of the starting materials, produce a mixture of polymers, some having a functionality of 2 (i.e. linear polymers), and some having a functionality of greater than two. The resulting mixture, taken as a whole, may have a functionality of slightly greater than 2 (e.g. 2.05) to as high as about 4. One skilled in the art may vary the functionality of the mixture of polymers by varying the relative amounts of starting materials to produce a mixture having physical properties, etc. which are desired.

As noted above, the non-crystallizing liquid polythioethers formed by the condensation reactions referred to above have 2 to 4 terminating vulcanizable radicals, i.e. hydroxyl groups. In addition to having terminating vulcanizable radicals, the liquid polythioethers of the present invention may have other terminating radicals such as terminating chemically non-reactive radicals.

Such liquid, polythioethers having terminating chemically non-reactive radicals may be formed in situ by including in the condensation reaction an organic compound which is chemically non-reactive except for a condensable radical (e.g. a hydroxyl radical) which will react with the hydroxyl groups in the beta-thioether diols during the condensation reaction thereby forming a liquid polythioether which is terminated with the chemically non-reactive radical of said organic compound, which will hereinafter be referred to as a "condensable, non-reactive organic compound". Alternatively, the terminal chemically non-reactive radicals may be introduced after formation of the hydroxyl terminated liquid polythioether by reaction with an organic compound which has a radical reactive with said terminal hydroxyl groups (hereinafter referred to as hydroxyl reactive organic compound). This hydroxyl reactive organic compound may have, as the only reactive group, a group which is reactive with hydroxyl, the remainder of the compound being chemically non-reactive, in which event there is formed a liquid polythioether terminated with chemically non-reactive radicals. On the other hand, the hydroxyl reactive organic compound may be difunctional, i.e. contain a reactive functional group in addition to the hydroxyl reactive group, in which case there is formed a liquid polythioether terminated with reactive functional groups, to which may be added an organic compound which has, the only reactive group, a group which will react with said reactive functional groups, the remainder of the compound being chemically non-reactive thereby forming a non-reactive radical.

In any event, the non-crystallizing water, solvent, fuel and temperature resistant linear liquid polythioethers of the present invention will have 2 terminating radicals and the branched liquid polythioethers will have 3 to 4 terminating radicals, said terminating radicals not substantially reducing the water, solvent, fuel and temperature resistance of the liquid polythioether.

The terminating radicals will include, inter alia, chemically non-reactive radicals as well as vulcanizable radicals such as low temperature vulcanizable radicals. It should be noted that by "low temperature" we mean a radical which is vulcanizable at a temperature of less than about 150° F. and preferably less than about 100° F.

In any event, the condensation of the beta-thioether diol, triol or tetrol and, if desired, the aforesaid organic compound having a condensable group, is accomplished by methods known in the art and therefore, again, no detailed exemplification thereof is necessary to teach those skilled in the art how to accomplish the condensation reaction. As is known, the reactants are mixed with a suitable etherifying catalyst and heated until water splits off which is then allowed to vaporize until such point in time as is necessary to pull a vacuum to remove the last traces of water. This is continued until the desired polymeric length is obtained which can be determined, for example, by determining the hydroxyl number in the reaction mixture.

The temperature at which the condensation reaction takes place may vary widely but in general is between 150° C. and 200° C. but below the boiling point of the reaction mixture. The etherification catalysts used in the present invention are esters or hemi-esters of phosphorus acid.

The preferred catalyst of the present invention is triphenyl phosphite. We have found that this catalyst produces excellent results, giving liquid polymers with narrower molecular weight distributions and less by-products.

As has been noted, it is preferred in the present invention that the organic triol or tetrol be a beta-thioether triol or tetrol since if used it will be included in the initial condensation reaction. The preferred beta-thioether triols and tetrols will have a molecular weight less than 360, have from 6 to 16 carbon atoms, have from 2 to 6 sulfur atoms, contain no groups or atoms which are reactive with hydroxyl groups (other than the three or four reactive hydroxyl groups) and have the formula:

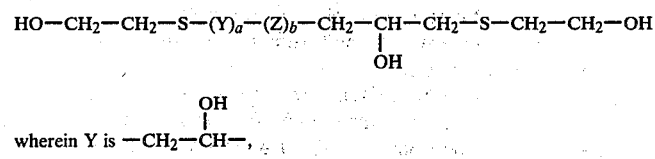

wherein Y is —CH$_2$—CH—,
$\quad\quad\quad\quad\quad\quad\quad$ |
$\quad\quad\quad\quad\quad\quad\quad$ OH each of a and b is 0 or 1 and Z is divalent hetero(lower) aliphatic such as oxy lower aliphatic. Exemplary of such beta-thioether triols or tetrols useful in the present invention are:

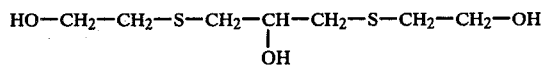

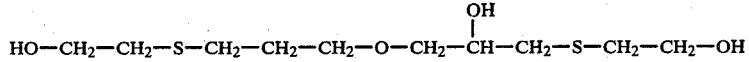

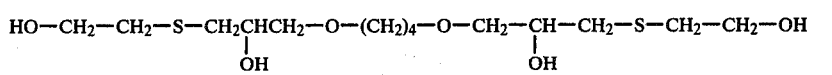

Such beta-thioether triols and tetrols may be made, for example, by the following reactions:

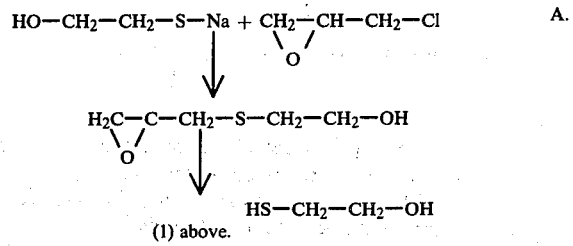

-continued

B.
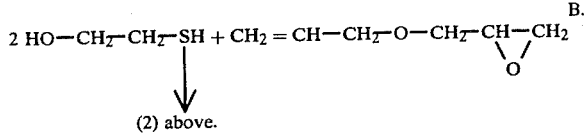

(2) above.

C.
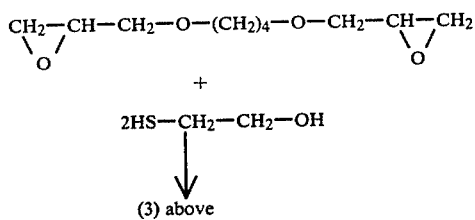
+

2HS—CH$_2$—CH$_2$—OH (3) above

The beta-thioether diols are, in general, known in the art and will have the following formula:

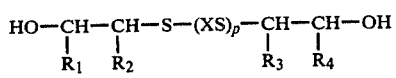

wherein R$_1$, R$_2$, R$_3$, R$_4$, X and p have the same meaning as indicated hereinbefore. In the case of the unsubstituted beta-thioether diols each of R$_1$, R$_2$, R$_3$ and R$_4$ is hydrogen and in the case of the substituted beta-thioether diols at least one of R$_1$, R$_2$, R$_3$ and R$_4$ is lower alkyl and preferably methyl and more preferably one or both of R$_1$ or R$_4$ are lower alkyl (preferably methyl) and R$_2$ and R$_3$ are hydrogen.

The unsubstituted beta-thioether diols are known in the art and therefore no detailed exemplification thereof is necessary. An exemplary unsubstituted beta-thioether diol is thiodiglycol.

The substituted beta-thioether diols are not as well known in the art but either the substituted or unsubstituted beta-thioether diols may be prepared by reacting mercapto-alcohols or dimercaptans with ethylene oxide or lower alkyl substituted epioxides according to the following reactions:

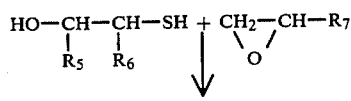

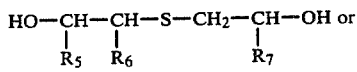

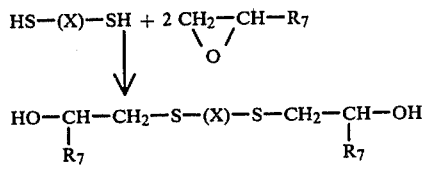

wherein each of R$_5$, R$_6$ and R$_7$ is hydrogen or lower alkyl, and X has the same meaning indicated hereinbefore. It should be noted that when R$_5$, R$_6$ and R$_7$ is hydrogen, unsubstituted beta-thioether diols are formed and when R$_5$, R$_6$ or R$_7$ is lower alkyl, substituted beta-thioether diols are formed. Exemplary substituted beta-thioether diols are

HOCH(CH$_3$)CH$_2$SCH$_2$CH(CH$_3$)OH;

HOCH$_2$CH$_2$SCH$_2$CH(CH$_3$)OH;

HOCH(CH$_3$)CH$_2$SCH$_2$CH$_2$OCH$_2$CH$_2$SCH$_2$CH(CH$_3$)OH;

HOCH(C$_3$)CH$_2$SCH$_2$CH$_2$SCH$_2$CH(CH$_3$)OH;

HOCH(CH$_3$)CH$_2$SCH$_2$CH$_2$CH$_2$CH$_2$SCH$_2$CH(CH$_3$)OH; and

Ti HOCH(CH$_3$)CH$_2$SCH$_2$CH$_2$SCH$_2$CH$_2$SCH$_2$CH(CH$_3$)OH

The branched chain liquid polythioethers of this invention will preferably have the formula R—(A—O—B)m wherein R is the fragment or grouping of the organic triol or tetrol R—(OH)m which has no chemically reactive groups other than hydroxyl groups and, in general will have a molecular weight of less than 400 and preferably less than 360 and, preferably, each hydroxyl is located beta to a sulfur atom. Also it is preferable if R has from 6 to 16 carbon atoms and 2 to 6 sulfur atoms. It is more preferable if R is aliphatic or hetero aliphatic sulfide, e.g. alkyl or heteroalkyl such as oxyalkyl and contains no reactive radical, and does not substantially reduce the water, solvent, fuel and temperature resistance of the polythioether. B is a terminating radical which preferably contains no more than twenty carbon atoms. A is a polymeric backbone or chain consisting of repeating units or groups of the formula

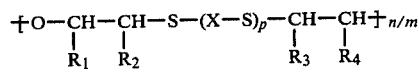

wherein R$_1$, R$_2$, R$_3$, R$_4$, X, p, n and m have the same meaning as indicated hereinbefore.

Preferably, the branched chain, non-crystallizing liquid polythioether will have the formula

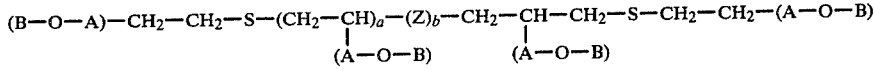

where B and Z have the meaning indicated hereinbefore, a is 0 or 1, b is 0 or 1, A is a polymeric backbone or chain consisting of repeating units or groups of the formula

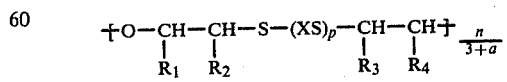

wherein R$_1$, R$_2$, R$_3$, R$_4$, X, p, n and a have the same meaning as indicated hereinbefore.

The preferred linear polythioether of the present invention having two terminating radicals has the formula

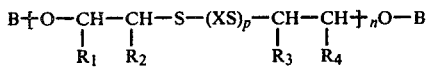

where $R_1$, $R_2$, $R_3$, $R_4$, X, n, p and B have the same meaning as indicated before.

The type of terminating radical on the liquid polythioethers is not important providing they do not substantially reduce the very desirable properties of the unique backbone of this invention, said properties including water, solvent, fuel and temperature resistance. Thus, the non-crystallizing liquid polythioethers may be used wherever a polymer having such properties are useful. If, for example, a water, solvent, fuel and temperature resistant solid elastomer is desired, the terminal radicals will be terminating vulcanizable radicals and if room or low temperature vulcanizable elastomers are desired such Vulcanizable radicals will be low temperature vulcanizable radicals. Such vulcanizable radicals, including low temperature ones, are known in the art and therefore "B" in the previous formulas may include epoxide, reactive silyls, isocyanate, reactive olefinic double bond, mercaptan or is hydrogen of a hydroxyl.

As has already been noted, the polythioethers of the present invention terminated with 2 to 4 hydroxyl groups are made by condensing the beta-thioether diol per se or with the organic triol or tetrol. Polythioethers having other vulcanizable radicals are also easily made. For example, such liquid polythioethers which have reactive olefinic double bonds may be made by adding to the condensation reaction a compound having the formula: $HO-CH_2-CH_2-S-R'-CH=CH_2$ wherein R' is alkylene of 4 to 6 carbon atoms.

Liquid polythioethers having terminating mercaptan radicals may be produced by reacting the polythioethers terminated with olefinic double bonds with an organic compound having two terminal mercaptan groups in the presence of an appropriate catalyst, e.g. a free radical initiating catalyst such as a peroxide and an amine having a $pK_b$ of 6 or less as disclosed in U.S. Pat. No. 3,923,748 issued Dec. 2, 1975.

As indicated in U.S. Pat. No. 3,923,748, the dimercaptan compounds may have the formula $R''(SH)_2$ wherein R'' is a divalent organic radical such as alkyl, aryl ether, alkyl ether, and the thioether thereof. Exemplary of such dimercaptan compounds, though not limited thereto are beta, beta'-dimercapto diethyl ether, beta, beta'-dimercapto diethyl sulfide, 1,6-dimercapto hexane and p,p'-dimercaptomethyl, diphenyl oxide.

The liquid polythioethers having terminating epoxide radicals may be made by reacting the hydroxyl or mercaptan terminated polythioethers with a diepoxide compound such as bisphenol A diglycidyl ether in the presence of an appropriate catalyst.

Similarly, liquid polythioethers having terminating isocyanate radicals may easily be produced by reacting the hydroxyl terminated polythioethers with an organic diisocyanate such as toluene diisocyanate.

The terminating reactive silyl radicals include hydrolyzable silyls such as lower alkoxy silane (e.g. tri(lower)alkoxy silane), acyloxy silane, silane oximes and silane hydrides. For example, a reactive silyl termination may be made by reacting a mercapto silane with the olefin terminated liquid polythioether.

The foregoing liquid polythioethers having terminating olefin radicals can be vulcanized by mixing therewith a stoichiometric amount of di- or trimercaptan and an appropriate catalyst or by free radical mechanism.

The liquid polythioethers of the present invention having terminating mercaptan vulcanizable radicals may be vulcanized by using an oxidizing agent such as a dichromate, an organic peroxide, an inorganic peroxide, a diepoxide, etc.

The liquid polythioethers having terminating epoxide vulcanizable radicals may be vulcanized by using a di- or triamine or a di- or trimercaptan.

The vulcanized products made from such liquid polythioethers will be solid polythioether elastomers, the vulcanization, in general taking place after application of the liquid polythioether to the desired place, such application being by pouring, brushing, spraying, etc.

The liquid polythioether may also be mixed with, prior to vulcanization, various additives such as plasticizers, fillers, colorants, and other monomeric or polymeric compounds in order to give the vulcanized polythioether certain desired properties known in the art.

Additionally, cure times and rates may be altered by adding other catalysts, reactants, etc. during vulcanization. For example, the addition of redox catalysts, such as an iron salt has been found to be of value in vulcanizing the mercaptan terminated polythioethers.

In addition to the terminating vulcanizable radicals, the non-crystallizing liquid polythioethers may also contain other terminating radicals such as terminating chemically non-reactive radicals.

It should be noted that by "chemically non-reactive" we mean a radical which is chemically inert or inactive with water and other substances, such as oxygen, generally found in the ambient. We have found, for example, that chemically non-reactive radicals which have a reactivity the same as, or less than the hydrogens on a benzene ring are quite satisfactory. Those chemically non-reactive radicals which are suitable for use in the present invention include aromatic, alkyl, heteroalkyl containing one or more heteroatoms (e.g. thioalkyl, oxyalkyl, etc.), alicyclic and heteroalicyclic, the hetero atom being sulfur and/or oxygen. In general, the number of carbon atoms in the chemically non-reactive radical will not exceed about twenty.

As has already been noted, the liquid polythioethers of our invention which have terminating chemically non-reactive radicals are useful for many purposes including plasticizers, dielectric fluids, high temperature lubricants and non-curing sealants, e.g. mastics.

When the non-crystallizing liquid polythioethers of the present invention are used as plasticizers they may be compounded with a number of liquid polymers with which they are compatible or miscible and may be added in the same amounts and for the same purpose as any of the common plasticizers. In this regard, the liquid polythioethers having terminating chemically non-reactive radicals of the present invention have all the necessary properties e.g. compatibility, low volatility and non-reactivity, of any good plasticizer but, in addition, also are fuel, solvent, temperature and water resistant as well as being non-crystallizing. The liquid polythioether plasticizers are therefore ideally suited for use with liquid elastomers and, particularly, with fuel, temperature and water resistant elastomers which are non-crystallizing, such as the liquid polythioether elastomers of the present invention.

The liquid polythioethers having terminating chemically non-reactive radicals, when used as plasticizers, may be incorporated with thermoplastic or thermosetting polymers. The amount of plasticizer used with any given polymer is the same as any other known plasticizer and depends upon the properties desired of the final composition. In general, it may be said that the amount of plasticizer will be between 1 and 50 parts by weight per hundred parts by weight of resin (phr). As noted before, such plasticizers are particularly useful when used in conjunction with liquid elastomers such as nitrile rubbers, polysulfides (e.g. Thiokol), etc. Particularly preferred non-crystallizing, water, solvent, fuel and temperature resistant elastomers with which the instant plasticizers are used are the liquid polythioethers of the present invention having terminating vulcanizable radicals.

As has been demonstrated hereinbefore, the liquid polythioethers having terminating chemically non-reactive radicals may be easily made following the teachings herein. For example, liquid non-crystallizing polythioethers having 2 to 4 terminating thioalkyl radicals may be produced by including in the condensation reaction, a beta thioether alcohol having the formula:

HO—CH$_2$—CH$_2$—S—R''' wherein R''' is alkyl of, e.g. from six to eight carbon atoms. Such beta-thioether alcohols may be made by reacting mercaptoethanol with an alpha-olefin such as alpha-hexene, alpha-heptene or alpha-octene in the presence of a free radical catalyst.

The aromatic terminated polythioethers may be produced by reacting the hydroxyl terminated polythioethers with para-toluene sulfonyl isocyanate or phenyl isocyanate. Alternatively such aromatic terminated polythioethers may be formed by reacting the hydroxyl terminated polythioethers with an aromatic diisocyanate such as toluene-2, 4-diisocyanate and then reacting the resulting isocyanate terminated polythioether with a lower alkyl alcohol.

Another alternative route to forming liquid polythioethers having terminating chemically non-reactive radicals is to first form polythioethers having terminating reactive radicals other than hydroxyl groups. For example, polythioethers having terminating reactive olefinic double bonds may be produced as exemplified hereinbefore. Such reactive olefinic double bonds may be converted to chemically non-reactive terminals by reacting the olefin terminated polythioethers with a lower alkyl or aryl mercaptan in the presence of an appropriate catalyst, e.g. a free radical initiating catalyst such as a peroxide and an amine having a pK$_b$ of 6 or less as disclosed in U.S. Pat. No. 3,923,748.

In order to fully illustrate the present invention the following examples are given, wherein all parts and percentages are by weight unless otherwise stated.

EXAMPLE 1

Synthesis of HTN (1-hydroxy, 3-thia, 8-nonene)

To 2105 grams (25.67 moles) of 1,5-hexadiene was added 5.0 grams of t-butyl perbenzoate. This mixture was heated to about 50° C. at which time a solution of 1950 grams (25.0 moles) of 2-mercaptoethanol and 2.5 grams of tetramethyl guanidine was added dropwise with vigorous stirring. The addition took 3 hours. After the addition the mixture was allowed to reflux for 2 hours and then allowed to stand overnight. Unreacted 1,5-hexadiene was recovered by distillation. The resulting product contained approximately 85–90% of 1-hydroxy, 3-thia, 8-nonene, a low melting white solid.

EXAMPLE 2

Synthesis of HDT(1,5,13 trihydroxy, 7-oxa, 3,11 dithia tridecane)

A 5 liter glass reactor with stirrer, thermometer and reflux condenser was used. 2496 grams (32.0 moles) of 2-mercaptoethanol were taken in this reactor. To this was added dropwise, 1824 grams (16.0 moles) of allyl glycidyl ether with vigorous stirring. The exotherm was controlled by water bath. After addition of allyl glycidyl ether, 3 grams of t-butyl perbenzoate and 0.3 grams of tetramethyl guanidine were added and the solution stirred. The completion of the reaction was determined by IR spectrum. The resulting material, 3,11-dithia, 7-oxa, 1,5,13-trihydroxy tridecane, was obtained in the form of a viscous liquid.

EXAMPLE 3

Synthesis of branched double bond terminated polythioether

| | |
|---|---|
| Thiodiglycol | 2500 grams |
| Hydroxyethyl, 2-hydroxy-propyl sulfide | 1071.5 grams |
| HTN (Example 1) | 357.2 grams |
| HDT (Example 2) | 44.6 grams |
| Triphenyl phosphite (catalyst) | 35.7 grams |
| Thiodiphenol (anti-oxidant) | 8.9 grams |

Procedure: The above ingredients were stirred together under nitrogen in a 4 liter glass reactor having a thermometer and a condenser for distillation. The temperature of the stirred mixture was kept at 150° C. for 5 hours after which it was raised to 180° C. This process was carried out under a stream of nitrogen. The distillate (mainly water) was collected until the vapor temperature of distillate dropped below 70° C. At this point the process of further condensation was carried out under full vacuum at 180°–185° C. until the material showed a hydroxyl number of less than 10 in an IR analysis. The resulting olefin terminated polymer had a viscosity of 840 poise and had a golden yellow color. This polymer when kept at 0° F. for 24 hours solidified to a soft gel which readily liquified when allowed to return to room temperature.

EXAMPLE 4

Synthesis of 2,9-dihydroxy, 4,7-dithiadecane (ethylene bis hydroxy propyl sulfide-glycol from ethane dithiol)

940 grams (10 moles) of ethane dithiol were taken in a flask fitted with a stirrer, a thermometer, a dropping funnel and a condenser. To this 1160 grams (20 moles) of propylene oxide were added dropwise with vigorous stirring. A slow exotherm developed which was controlled by using a water bath. After the exotherm subsided the liquid was examined in an IR analysis. The reaction was found to have completed.

EXAMPLE 5

Synthesis of 2,12 dihydroxy, 7-oxa, 4,10 dithia tridecane (glycol from dimercaptodiethyl ether)

700 Grams (5.07 moles) of dimercaptodiethyl ether were taken in a three necked glass reactor fitted with a stirrer, a thermometer, a dropping funnel and a condenser. To this 588 grams (10.14 moles) of propylene oxide were added dropwise with vigorous stirring. A mild exotherm slowly developed which was controlled by using a water bath. The reaction was found to be complete as evidenced by the absence of mercaptan or epoxy bands in the IR spectrum.

EXAMPLE 6

Synthesis of 2,12-dihydroxy, 4,7,10 trithia tridecane (glycol from dimercapto diethyl sulfide)

To 781 grams (5.07 moles) of dimercapto diethyl sulfide in a 3 necked flask fitted with a stirrer, a dropping funnel, a thermometer and a condenser, 588 grams (10.14 moles) of propylene oxide were added dropwise with vigorous stirring. No immediate reaction was observed (no exotherm). 5 drops of triethylamine and tetramethyl guanidine catalyst were then added and the mixture warmed slowly to 50° C. A slow exotherm was observed. The reaction was continued at 50° to 60° C. with refluxing until all propylene oxide had been reacted, the composition was allowed to stand overnight when it solidified to a low melting solid. IR examination indicated the completion of reaction.

EXAMPLE 7

Synthesis of TDDO(1,5,14,18-tetrahydroxy, 7,12-dioxa, 3,16-dithia octadecane)

To a 5 liter glass reactor fitted with stirrer, thermometer, and reflux condenser was added 2,424 grams (12 moles) of butyldiglycidyl ether. To this was added 1872 grams (24 moles) of 2-mercaptoethanol in the form of a slow stream with constant stirring. The temperature was raised to 50° C. whereupon an exotherm occurred and the temperature increased rapidly to 140° C. The temperature was controlled by water bath. After complete addition of the mercaptoethanol, which took 4 hours, the mixture was stirred for another 3 hours and then allowed to react overnight undisturbed. At the end of this period a thick liquid was obtained. IR spectrum indicated that the reaction was complete.

EXAMPLE 8

Synthesis of branched double bond terminated polythioether

In a 4 liter glass reactor fitted with a stirrer, a thermometer and a distillation condenser the following materials were added:

| Thiodiglycol | 1645.0 grams |
| Hydroxyethyl, 2-hydroxy propyl sulfide | 705.4 grams |
| HDT (Example 2) | 29.4 grams |
| Triphenyl phosphite | 26.1 grams |
| Thiodiphenol | 6.5 grams |

The mixture was heated under a stream of nitrogen with stirring at 180° C. for six hours. Water of condensation was collected. At this time 235.2 grams of olefin terminated alcohol (HTN, Example 1) was added. Heating was continued at 180° C. for six more hours after which nitrogen was stopped and vacuum applied and the remaining condensation reaction carried out under these conditions until the IR analysis of polymer showed a hydroxyl number of less than 10. This IR spectrum was identical to that of the material in Example 3 and the two polymer samples showed similar physical properties.

EXAMPLE 9

Synthesis of linear hydroxyl terminated polythioether

| Thiodiglycol | 1400 grams |
| Hydroxyethyl, 2-hydroxy propyl sulfide | 600 grams |
| Triphenyl phosphite | 20 grams |
| Thiodiphenol | 2.5 grams |

The above ingredients were mixed in a 4 liter glass reactor fitted with a stirrer, a thermometer and a distillation condenser and heated under a stream of nitrogen at 180° C. until the vapor temperature of condensate dropped from initial 120° C. to less than 70° C. At this time vacuum was applied and the reaction of condensation continued at 180° C. until the rate of condensation was negligible as evidenced by collected distillate. The polymer obtained was a thick clear brownish liquid with a viscosity of 475 poise and hydroxyl number of 32.

EXAMPLE 10

Synthesis of linear hydroxyl terminated polythioether (higher viscosity than Example 9)

| Thiodiglycol | 2420 grams |
| Hydroxyethyl, 2-hydroxypropyl sulfide | 1037 grams |
| Triphenyl phosphite (catalyst) | 34.6 grams |
| Thiodiphenol (anti-oxidant) | 8.6 grams |

Procedure: The above materials were stirred together under nitrogen in a 4 liter glass reactor equipped with a thermometer and condenser for distillation. The temperature of the mixture was kept at 150° C. for 5 hours after which it was raised to 180° C. This process was carried out under a stream of nitrogen, and 180° C. was maintained until the vapor temperature of the distillate dropped below 90° C. At this point further reaction was carried out under full vacuum at 180°–185° C. until the material showed a hydroxyl number of about 22. The resulting polymer was a brown, clear liquid with a viscosity of 1743 poise.

EXAMPLE 11

Synthesis of linear hydroxyl terminated polythioether

| Thiodiglycol | 1540 grams |
| Ethylene bis hydroxypropyl sulfide (Example 4) | 460 grams |
| Triphenyl phosphite | 20 grams |
| Thiodiphenol | 2.5 grams |

In a 4 liter glass reactor fitted with stirrer, thermometer and distillation condenser the above ingredients were heated at 180° C. under a stream of nitrogen until the vapor temperature of condensate dropped below 70° C. At this time nitrogen was stopped and full vacuum applied and the remaining reaction carried out until the rate of condensation became negligible. A thick liquid polymer with a viscosity of 530 poise and hydroxyl number of 35 was thus obtained.

EXAMPLE 12

Synthesis of linear hydroxyl terminated polythioether

| | |
|---|---|
| Thiodiglycol | 1467.5 grams |
| Bis-hydroxy propyl thioethylene oxide (Example 5) | 555.0 grams |
| Triphenyl phosphite | 20.0 grams |
| Thiodiphenol | 2.5 grams |

In a 4 liter glass reactor fitted with distillation condenser, stirrer and thermometer, the above ingredients were allowed to react under a stream of nitrogen at 180° C. Water, the product of condensation reaction, was collected until the rate of condensation dropped and temperature of vapor at condenser head dropped to less than 70° C. At this point nitrogen was stopped, full vacuum applied and the condensation reaction continued under these conditions at 180° C. until the rate of condensation dropped to negligible. The polymer obtained thus was a thick brownish liquid with viscosity 500 poise and hydroxyl number 36.

EXAMPLE 13

Synthesis of branched double bond terminated polythioether

| | |
|---|---|
| Thiodiglycol | 2178 grams |
| Hydroxyethyl, 2-hydroxypropyl sulfide | 933 grams |
| HTN (Example 1) | 311 grams |
| HDT (Example 2) | 39 grams |
| Triphenyl phosphite | 31 grams |
| Thiodiphenol | 7.8 grams |

Procedure: The above ingredients were stirred together under nitrogen in a 4-liter glass reactor equipped with a thermometer and a condenser for distillation. The temperature of the mixture was kept at 150° C. for 5 hours, after which it was raised to 180° C. This process was carried out under nitrogen and the reaction temperature was maintained at 180° C. until the vapor temperature of the distillate dropped below 90° C. At this point further reaction was carried out under full vacuum at 180°-185° C. until analysis showed a hydroxyl number of approximately 10 or less. The resulting polymer was a clear, light brown liquid with a viscosity of 406 poise.

EXAMPLE 14

Synthesis of branched thioalkyl terminated polythioether

| | |
|---|---|
| Thiodiglycol | 1182.2 grams |
| Hydroxyethyl 2-hydroxypropyl sulfide | 506.7 grams |
| HDT (Example 2) | 21.1 grams |
| Hydroxyethyl hexyl sulfide (HEHS) | 171.0 grams |
| Triphenyl phosphite | 16.9 grams |
| Thiodiphenol | 4.2 grams |

Procedure: The above ingredients were stirred together under nitrogen in a 2 liter glass reactor having a thermometer and a condenser for distillation. The temperature of the stirred mixture was kept at 150° C. for 5 hours after which it was raised to 180° C. This process was carried out under a stream of nitrogen and this temperature was maintained for 8 hours. At this point, further reaction was carried out under full vacuum at 180°-185° C. until analysis showed a hydroxyl number of approximately 10 or less. The resulting polythioether had a viscosity of 110 poise and a clear brown color.

EXAMPLE 15

Synthesis of branched thioalkyl terminated polythioether of higher viscosity than Example 14

| | |
|---|---|
| Thiodiglycol | 1291.0 grams |
| Hydroxyethyl, 2-hydroxypropyl sulfide | 612.0 grams |
| HDT (Example 2) | 37.5 grams |
| HEHS | 111.4 grams |
| Triphenyl phosphite | 17.4 grams |
| Thiodiphenol | 4.3 grams |

Procedure: The above ingredients were stirred together under nitrogen in a 2 liter glass reactor having a thermometer and condenser for distillation. The temperature of the stirred mixture was kept at 150° C. for 5 hours after which it was raised to 180° C. This process was carried out under nitrogen, and the temperature was maintained at 180° C. for 8 hours. At this point further reaction was carried out under full vacuum at 180°-185° C. Final analysis showed a hydroxyl number of approximately 10 or less. The polythioether thus formed was a clear brown liquid with a viscosity of 630 poise.

EXAMPLE 16

Synthesis of branched mercaptan terminated polythioether

| | |
|---|---|
| Double bond terminated polymer of Example 3 | 100 grams |
| Dimercaptodiethyl sulfide | 8.2 grams |
| t-butyl perbenzoate | 0.6 grams |
| Tetramethyl guanidine | 0.1 grams |

Procedure: The materials were slowly stirred together (no vortex formed) initially in a lined can or a polyethylene container. The batch was covered and placed in a 158° F. oven for 16 hours without stirring. Analysis of infra red spectrum of the resulting product showed conversion of all olefinic groups. The final product had a viscosity of 470 poise at 79° F. and cured to a tack-free rubber of 42 Rex hardness in 24 hours at room temperature when cured with a lead peroxide paste and to a tack-free rubber of 27 Rex hardness when cured with a MnO$_2$ accelerator.

The compositions of the MnO$_2$ accelerator and lead peroxide paste are as follows:

| A. Composition of manganese dioxide accelerator | |
|---|---|
| Santicizer 278 (phthalate ester plasticizer) | 52.0 grams |
| Philblack N-550 Carbon black | 5.0 grams |
| Diphenyl Guanidine | 8.0 grams |
| Manganese Dioxide | 100.0 grams |
| Stearic Acid | 0.67 grams |
| Sodium stearate | 1.33 grams |
| B. Composition of lead peroxide paste | |
| Lead peroxide | 100.0 grams |
| Liquid chlorinated paraffin | 100.0 grams |

EXAMPLE 17

Synthesis of branched siloxane terminated polythioether

| Example: | |
|---|---|
| Olefin terminated polymer of Example 3 | 100.0 grams |
| Mercaptopropyl triethoxy silane | 10.87 grams |
| Triethylamine | 0.40 grams |
| t-butyl perbenzoate | 0.60 grams |
| Tetramethyl guanidine | 0.10 grams |

Procedure: All ingredients were gently mixed in a polyethylene cup or a phenolic lined can. The batch was nitrogen blanketed, covered and heated without further stirring at 158° F. for 16 hours. Analysis of infrared spectrum of resulting material showed conversion of all olefinic groups. The product cured to a soft tack-free rubber when mixed with dibutyl-tin dilaurate and kept overnight at ambient.

EXAMPLE 18

Compounding of Polythioether of Example 16

The polythioether of Example 16 was compounded as follows:

| | Part by wt. |
|---|---|
| Mercaptan terminated polymer (Example 16) | 100 |
| Calcium carbonate | 54 |
| Hydrated aluminum oxide | 15.6 |
| Zinc oxide | 2.0 |
| Silane adhesion promoter | 1.25 |
| Ferric acetylacetonate (Redox catalyst) | 0.25 |

The compounded polymer was mixed intimately with Manganese dioxide accelerator of Example 16 in the weight ratio of 10:1 and cured at ambient in the form of a sheet of approximately ⅛" thickness. The following physical properties were obtained:

| Tack-free time: | 24 hours |
|---|---|
| Cure Hardness at room temperature: | 48 hours 45 Rex |
| | 72 hours 48 Rex |
| | 96 hours 50 Rex |
| Tensile strength | 260 PSI |
| Elongation | 300% |

Thermal (pressure) rupture test as specified in MIL-S-8802 was conducted on a specimen cured according to the schedule of the aforesaid military specification (7 days at room temperature followed by 1 day at 140° F.). The specimen performed as follows:

| | Test Temp. | Time | Pressure | Extrusion |
|---|---|---|---|---|
| 1. | 150° F. | 30 min. | 10 PSI | nil |
| 2. | 375° F. | 30 min. | 10 PSI | nil |
| 3. | 400° F. | 30 min. | 10 PSI | 1/16 |
| 4. | 425° F. | 15 min. | 10 PSI | Blow out |

Another thermal rupture specimen was immersed in Jet Reference Fuel (JRF) for 7 days at 140° F. and then tested at 400° F. under 10 PSI pressure. After 30 minutes the extrusion was zero. Fuel resistance of above cured specimens was tested in JRF according to MIL-S-83430. Weight loss was 3.53% (allowed 8%).

The same compounded polymer when cured with dichromate accelerator gave the following hardness rubbers:

| 24 hours at room temperature | 45 Rex |
|---|---|
| 48 hours at room temperature | 50 Rex |
| 96 hours at room temperature | 55 Rex |

The composition of the Dichromate Accelerator is:

| Calcium dichromate | 80.00 grams |
|---|---|
| Water | 70.38 grams |
| Dimethyl acetamide | 98.30 grams |
| Raven 1040 Carbon black | 2.60 grams |
| Burgess clay | 54.00 grams |

EXAMPLE 19

Synthesis of branched polythioether using 100% hydroxyethyl, 2-hydroxypropyl sulfide (double bond terminated)

| Hydroxyethyl, 2-hydroxy propyl sulfide | 2000 grams |
|---|---|
| HTN (Example 1) | 182.5 grams |
| HDT (Example 2) | 23.1 grams |
| Triphenyl phosphite | 18.5 grams |
| Thiodiphenol | 4.6 grams |

Procedure: The above ingredients were mixed together under nitrogen in a 4 liter glass reactor fitted with thermometer, a stirrer and a condenser for distillation. The temperature of stirred mixture was maintained at 150° C. under nitrogen for 5 hours after which it was slowly brought to 180° C. The distillate (mainly water) was collected until the vapor temperature of distillate dropped below 80° C. Thereafter the process of condensation was carried out under full vacuum at 180° C. until the material showed a hydroxyl number of less than 10 in an IR analysis. The resulting olefin terminated amber colored polymer had a viscosity of 165 poise. This polymer when kept at 0° F. for 24 hours stayed a thick liquid.

EXAMPLE 20

Synthesis of branched thioalkyl terminated polythioether using tetrafunctional TDDO as the beta-thioether tetrol

| Thiodiglycol | 1182.2 grams |
|---|---|
| Hydroxyethyl, 2-hydroxy-propyl sulfide | 506.7 grams |
| TDDO (Example 7) | 28.0 grams |
| HEHS | 171.0 grams |
| Triphenyl phosphite | 16.9 grams |
| Thiodiphenol | 4.2 grams |

Procedure: The above ingredients were stirred together under nitrogen in a 2 liter glass reactor equipped with a thermometer and condenser for distillation. The temperature of the stirred mixture was maintained at 150° C. for 5 hours after which it was raised to 180° C. This process was carried out under nitrogen and the 180° C. temperature was maintained for 8 hours. Further condensation was then carried out under full vacuum at 180°–185° C. until analysis showed a hydroxyl number of approximately 10 or less. The resulting polythioether was a clear brown liquid with a viscosity of 80 poise.

EXAMPLE 21

Synthesis of linear aromatic terminated polythioether

| Hydroxyl terminated polymer of | |
|---|---|
| Example 10 | 200.0 grams |
| Tosyl isocyanate | 15.2 grams |
| Triethylamine | 0.1 grams |

Procedure: The above materials were stirred together in a lined can under a stream of nitrogen. The can was covered and placed in a 140° F. oven for 16 hours without stirring. IR analysis of the resultant product showed the absence of hydroxyl and isocyanate bands thus indicating that the reaction was complete. The resulting polythioether had a clear amber color with a viscosity of 3000 poise.

EXAMPLE 22

Synthesis of linear aromatic terminated polythioether

| Hydroxyl terminated polymer of | |
|---|---|
| Example 3 | 200.0 grams |
| Phenyl isocyanate | 9.2 grams |
| Triethylamine | 0.1 grams |

Procedure: The above materials were stirred together in a lined can under a stream of nitrogen. The can was covered and placed in a 140° F. oven for 16 hours without stirring. IR analysis showed the reaction was complete through the disappearance of the hydroxyl and isocyanate bands. The resulting polythioether was a clear amber liquid with a viscosity of 1725 poise.

EXAMPLE 23

Synthesis of linear aromatic terminated polythioether

| Hydoxyl terminated polymer | |
|---|---|
| of Example 3 | 200.0 grams |
| Toluene-2, 4-diisocyanate | 13.4 grams |
| Triethylamine | 0.1 grams |

Procedure: The above materials were stirred together in a lined can under a stream of nitrogen. The can was covered and placed in a 140° F. oven for 16 hours, without stirring. Isocyanate analysis showed the reaction to be complete. At this point 7.6 grams n-butanol were added along with an additional 0.1 gram triethylamine catalyst. The materials were again stirred, covered, and placed in a 158° F. oven for 16 hours. At the end of this period an IR spectrum of the material showed no hydroxyl or isocyanate band. This indicated the completion of reaction. The resulting polythioether was a clear amber liquid with a viscosity of 4800 poise.

EXAMPLE 24

Synthesis of branched aromatic terminated polythioether

| Double bond terminated | |
|---|---|
| polymer of Example 13 | 200.0 grams |
| Thiophenol | 15.3 grams |
| Free radical catalyst | 1.2 grams |
| Xylene | 8.8 grams |

Procedure: After mixing the catalyst in Xylene, the above materials were mixed together in a lined can, covered, and placed in a 140° F. oven for 16 hours without stirring. IR analysis showed the reaction to be complete through the disappearance of the double bond as well as mercaptan bands. The resultant polythioether was a clear, light amber liquid having a viscosity of 380 poise.

EXAMPLE 25

Synthesis of linear thioalkyl terminated polythioether

| Hydroxyl terminated polymer | |
|---|---|
| of Example 10 | 1000 grams |
| HEHS | 64.8 grams |
| Triphenyl phosphite | 5.0 grams |

Procedure: The above materials were stirred together under nitrogen in a 2 liter glass reactor equipped with a thermometer and a condenser for distillation. The mixture temperature was maintained at 150° C. for 5 hours after which it was raised to 180° C. and full vacuum was applied. The reaction was carried out under these conditions until analysis showed a hydroxyl number lower than 10. The resulting polythioether was a clear light amber liquid with a viscosity of 170 poise.

EXAMPLE 26

Synthesis of branched vulcanizable mercaptan terminated polythioether

| Double bond terminated polymer | |
|---|---|
| of Example 13 | 100 grams |
| Dimercaptodiethyl sulfide | 8.2 grams |
| t-butyl perbenzoate | 0.6 grams |
| Tetramethyl guanidine | 0.1 grams |

Procedure: The materials were slowly stirred together (no vortex formed) in a lined can. The batch was covered and placed in a 158° F. oven for 16 hours without stirring. Analysis of infrared spectrum of the resulting product showed conversion of all olefinic groups. The final product had a viscosity of 470 poise at 79° F.

EXAMPLE 27

Preparation of elastomeric composition

The polymer of Example 26 was compounded as follows:

| | Parts by Wt. |
|---|---|
| Mercaptan terminated polymer | |
| of Example 26 | 100 |
| Calcium carbonate | 55 |
| Hydrated aluminum oxide | 7.5 |
| Zinc oxide | 3.0 |
| Silane adhesion promoter | 1.5 |
| Ferric acetyl acetonate | |
| (Redox catalyst) | 0.25 |
| Polythioether (plasticizer) | |
| of Example 25 | 5.0 |

EXAMPLE 28

Preparation of manganese dioxide accelerator for curing of composition of Example 27

|  | Parts by Wt. |
|---|---|
| Plasticizer of Example 25 | 52.0 |
| Philblack N-550 carbon black | 44.3 |
| Diphenyl guanidine | 8.0 |
| Manganese dioxide | 100.0 |
| Stearic acid | 0.67 |
| Sodium stearate | 1.33 |

The compounded polymer of Example 27 was intimately mixed with the manganese dioxide accelerator in the weight ratio of 10:1 and cured at ambient in the form of a sheet of approximately ⅛″ thickness. The following physical properties were obtained:

| Tack free time: | 24 hours |
|---|---|
| Cure Hardness at room temperature: | 48 hours 40 Rex |
|  | 72 hours 45 Rex |
|  | 96 hours 50 Rex |
| Tensile strength: | 495 PSI |
| Elongation: | 250% |

Thermal (pressure) rupture test as specified in MIL-S-8802 was conducted on a specimen cured according to schedule of the aforesaid military specification (7 days at room temperature followed by 1 day at 140° F.). The specimen performed as follows:

|  | Test Temp. | Time | Pressure | Extrusion |
|---|---|---|---|---|
| 1. | 350° F. | 30 min. | 10 PSI | nil |
| 2. | 400° F. | 30 min. | 10 PSI | 1/32″ |

Another similar specimen was immersed in jet reference fuel (JRF) for 7 days at 140° F. and then tested at 400° F. under 10 PSI pressure. After 30 minutes the extrusion was zero.

EXAMPLE 29

Synthesis of branched hydroxyl terminated polythioether

| Thiodiglycol | 1400.5 grams |
|---|---|
| Thiodipropylene glycol | 274.5 grams |
| HDT (Example 2) | 21.1 grams |
| Triphenyl phosphite | 16.7 grams |
| Thiodiphenol | 4.2 grams |

Procedure: The mixture of the above ingredients was stirred under nitrogen in a 4 liter glass reactor fitted with a thermometer and a condenser for distillation. The temperature was maintained at 150° C. for 5 hours after which it was raised to 180° C. This process was carried out under a stream of nitrogen and the temperature of 180° C. was maintained until the vapor temperature dropped below 90° C. At this point further reaction was carried out under full vacuum at 180° C. to 185° C. until the material showed a hydroxyl number of about 25. The resulting polymer was a light yellow clear liquid with a viscosity of 195 poise. The polymer when kept at 0° F. for 18 hours solidified but returned to its original liquid state on thawing.

We claim:

1. A non-crystallizing, water, solvent, and fuel resistant liquid polythioether having two to four terminating radicals which do not substantially reduce the water, solvent, and fuel resistance and a water, solvent, and fuel resistant polymeric backbone having repeating units of the formula:

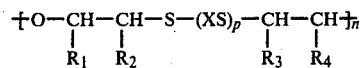

wherein each of $R_1$, $R_2$, $R_3$ and $R_4$ is hydrogen or lower alkyl providing that a sufficient number of $R_1$, $R_2$, $R_3$ and/or $R_4$ are lower alkyl in said polymeric backbone to render said backbone non-crystallizing; X is a divalent organic radical selected from $-CH_2-CH_2-$, $-CH_2-CH_2-CH_2-CH_2-$, $-CH_2-CH_2-S-CH_2-CH_2-$ or $-CH_2-CH_2-O-CH_2-CH_2-$; n is 8 to 200; and p is 0 or 1.

2. A liquid polythioether according to claim 1 wherein the total number of $R_1$, $R_2$, $R_3$ and/or $R_4$ which are lower alkyl in said polymeric backbone is at least the nearest whole number to the quotient of n/5.

3. A liquid polythioether according to claim 1 wherein the total number of $R_1$, $R_2$, $R_3$ and/or $R_4$ which are lower alkyl in said polymeric backbone is at least the nearest whole number to the quotient of n/4.

4. A liquid polythioether according to claim 2 or 3 wherein lower alkyl is methyl.

5. A liquid polythioether according to claim 1 wherein p is 0.

6. A liquid polythioether according to claim 1 wherein at least one of $R_1$ or $R_4$ is lower alkyl and each of $R_2$ and $R_3$ is hydrogen.

7. A liquid polythioether according to claim 1 wherein said terminating radicals do not exceed twenty carbon atoms.

8. A liquid polythioether according to claim 7 wherein said terminating radicals are chemically non-reactive.

9. A liquid polythioether according to claim 8 wherein said polythioether is linear and has two chemically non-reactive radicals.

10. A liquid polythioether according to claim 8 wherein said polythioether is branched and has 3 or 4 chemically non-reactive radicals.

11. A liquid polythioether according to claims 9 or 10 wherein said terminating chemically non-reactive radical is selected from the group consisting of aromatic, alkyl, heteroalkyl, alicyclic and heteroalicyclic.

12. A liquid polythioether according to claim 11 wherein the number of carbon atoms in said chemically non-reactive radical does not exceed ten.

13. A liquid polythioether according to claim 8 wherein said terminating chemically non-reactive radical is thioalicyclic or oxyalicyclic.

14. A liquid polythioether according to claim 8 wherein said terminating chemically non-reactive radical is aromatic.

15. A liquid polythioether according to claim 8 wherein said terminating chemically non-reactive radical is heteroalkyl.

16. A liquid polythioether according to claim 8 wherein said terminating chemically non-reactive radical is alkyl.

17. A liquid polythioether according to claim 15 wherein said heteroalkyl is selected from the group consisting of thioalkyl and oxyalkyl.

18. A liquid polythioether according to claim 1 wherein said terminating radicals are vulcanizable.

19. A liquid polythioether according to claim 18 wherein said polythioether is linear and has two vulcanizable radicals.

20. A liquid polythioether according to claim 18 wherein said polythioether is branched and has 3 or 4 vulcanizable radicals.

21. A liquid polythioether according to claim 19 wherein said vulcanizable radical is hydroxyl.

22. A liquid polythioether according to claim 19 wherein said vulcanizable radical is reactive silyl.

23. A liquid polythioether according to claim 20 wherein said low temperature vulcanizable radical is selected from the group consisting of hydroxyl, epoxide, reactive silyl, isocyanate, reactive olefinic double bond and mercaptan.

24. A liquid polythioether according to claim 23 wherein said vulcanizable radical is hydroxyl.

25. A liquid polythioether according to claim 23 wherein said vulcanizable radical is reactive olefinic double bond.

26. A liquid polythioether according to claim 23 wherein the vulcanizable radical is epoxide.

27. A liquid polythioether according to claim 23 wherein the vulcanizable radical is isocyanate.

28. A liquid polythioether according to claim 23 wherein the vulcanizable radical is mercaptan.

29. A non-crystallizing, linear, water, solvent and fuel resistant liquid polythioether having the formula

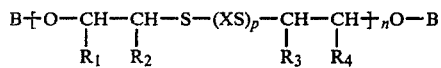

wherein each of $R_1$, $R_2$, $R_3$ and $R_4$ is hydrogen or lower alkyl with the provision that a sufficient number of $R_1$, $R_2$, $R_3$ and/or $R_4$ are lower alkyl in said polymeric backbone to render said backbone non-crystallizing; X is a divalent organic radical selected from $-CH_2-CH_2-$, $-CH_2-CH_2-CH_2-CH_2-$, $-CH_2-CH_2-S-CH_2-CH_2-$, or $-CH_2-CH_2-O-CH_2-CH_2-$; n is 8 to 200, p is 0 or 1 and B is a terminating radical which does not substantially reduce the water, solvent and fuel resistance.

30. A liquid polythioether according to claim 29 wherein the total number of $R_1$, $R_2$, $R_3$ and/or $R_4$ which are lower alkyl in said polymeric backbone is at least the nearest whole number to the quotient of n/5.

31. A liquid polythioether according to claim 29 wherein the total number of $R_1$, $R_2$, $R_3$ and/or $R_4$ which are lower alkyl in said polymeric backbone is at least the nearest whole number to the quotient of n/4.

32. A liquid polythioether according to claim 29 wherein at least one of $R_1$ or $R_4$ is lower alkyl and each of $R_2$ and $R_3$ is hydrogen.

33. A liquid polythioether according to claims 30, 31 or 32 wherein lower alkyl is methyl.

34. A liquid polythioether according to claim 29 wherein p is 0.

35. A liquid polythioether according to claim 29 wherein said terminating radical does not exceed twenty carbon atoms.

36. A liquid polythioether according to claim 29 wherein said terminating radical is chemically non-reactive.

37. A liquid polythioether according to claim 36 wherein said chemically non-reactive radical selected from the group consisting of aromatic, alkyl, heteroalkyl, alicyclic and heteroalicyclic.

38. A liquid polythioether according to claim 37 wherein the number of carbon atoms in said chemically non-reactive radical does not exceed ten.

39. A liquid polythioether according to claim 37 wherein said chemically non-reactive radical is thioalicyclic or oxyalicyclic.

40. A liquid polythioether according to claim 37 wherein said chemically non-reactive radical is aromatic.

41. A liquid polythioether according to claim 37 wherein said chemically non-reactive radical is heteroalkyl.

42. A liquid polythioether according to claim 37 wherein said chemically non-reactive radical is alkyl.

43. A liquid polythioether according to claim 41 wherein said heteroalkyl is selected from the group consisting of thioalkyl and oxyalkyl.

44. A liquid polythioether according to claims 20 or 35 wherein said terminating radical is a vulcanizable radical.

45. A liquid polythioether according to claim 44 wherein said vulcanizable radical is selected from the group consisting of epoxide, reactive silyl, isocyanate, reactive olefinic double bond, mercaptan and hydrogen of a hydroxyl group.

46. A liquid polythioether according to claim 44 wherein the vulcanizable radical is epoxy.

47. A liquid polythioether according to claim 44 wherein the vulcanizable radical is reactive silyl.

48. A liquid polythioether according to claim 44 wherein the vulcanizable radical is isocyanate.

49. A liquid polythioether according to claim 44 wherein the vulcanizable radical is mercaptan.

50. A non-crystallizing, branched, water, solvent, and fuel resistant liquid polythioether, said liquid polythioether having the formula $R-(A-O-B)_m$ wherein R is the fragment of the organic triol or tetrol $R-(OH)_m$ having a molecular weight of less than 400; m is 3 or 4; B is a terminating radical which does not substantially reduce the water, solvent, and fuel resistance; and A is a polymeric backbone of repeating units of the formula

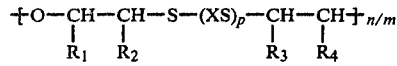

wherein each of $R_1$, $R_2$, $R_3$ and $R_4$ is hydrogen or lower alkyl providing that a sufficient number of $R_1$, $R_2$, $R_3$ and/or $R_4$ are lower alkyl in said polymeric backbone to render said backbone non-crystallizing; X is a divalent organic radical selected from $-CH_2-CH_2-$, $-CH_2-CH_2-CH_2-CH_2$, $-CH_2-CH_2-S-CH_2-CH_2-$ or $-CH_2-Ch_2-O-CH_2-CH_2-$; n is 8 to 200; m is 3 or 4; and p is 0 to 1.

51. A liquid polythioether according to claim 50 wherein $R-(OH)_m$ has a molecular weight of less than 360.

52. A liquid polythioether according to claim 51 wherein each hydroxyl is $R-(OH)_m$ is located beta to a sulfur atom.

53. A liquid polythioether according to claim 52 wherein R is aliphatic sulfide or heteroaliphatic sulfide.

54. A liquid polythioether according to claim 50 wherein the total number of $R_1$, $R_2$, $R_3$ and/or $R_4$ which are lower alkyl in said polymeric backbone is at least the nearest whole number to the quotient of n/5.

55. A liquid polythioether according to claim 50 wherein the total number of $R_1$, $R_2$, $R_3$ and/or $R_4$ which are lower alkyl in said polymeric backbone is at least the nearest whole number to the quotient of n/4.

56. A liquid polythioether according to claim 50 wherein at least one of $R_1$ or $R_4$ is lower alkyl and each of $R_2$ and $R_3$ is hydrogen.

57. A liquid polythioether according to claim 56 wherein lower alkyl is methyl.

58. A liquid polythioether according to claim 50 where p is 0.

59. A liquid polythioether according to claim 50 wherein said terminating radical does not exceed twenty carbon atoms.

60. A liquid polythioether according to claim 59 wherein said terminating radical is chemically non-reactive.

61. A liquid polythioether according to claim 60 wherein said terminal chemically non-reactive radical is selected from the group consisting of aromatic, heteroalkyl, alicyclic and heteroalicyclic.

62. A liquid polythioether according to claim 61 wherein the number of carbon atoms in said terminal chemically non-reactive radical does not exceed ten.

63. A liquid polythioether according to claim 60 wherein said terminal chemically non-reactive radical is thioalicyclic or oxyalicyclic.

64. A liquid polythioether according to claim 60 wherein said terminal chemically non-reactive radical is aromatic.

65. A liquid polythioether according to claim 60 wherein said terminal chemically non-reactive radical is heteroalkyl.

66. A liquid polythioether according to claim 60 wherein said terminal chemically non-reactive radical is alkyl.

67. A liquid polythioether according to claims 50 or 59 wherein said terminating radical is vulcanizable.

68. A liquid polythioether according to claim 67 wherein said vulcanizable radical is selected from the group consisting of epoxide, reactive silyl, isocyanate, reactive olefinic double bond, mercaptan and hydrogen of a hydroxyl group.

69. A liquid polythioether according to claim 67 wherein the vulcanizable radical is epoxide.

70. A liquid polythioether according to claim 67 wherein the vulcanizable radical is reactive silyl.

71. A liquid polythioether according to claim 67 wherein the vulcanizable radical is isocyanate.

72. A liquid polythioether according to claim 67 wherein the vulcanizable radical is mercaptan.

73. A liquid polythioether according to claim 67 wherein the vulcanizable radical is hydrogen of a hydroxyl.

74. A non-crystallizing, water, solvent, and fuel resistant liquid polythioether having the formula

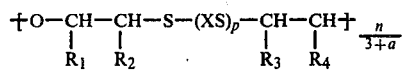

each of a, b, and p is 0 or 1; each of $R_1$, $R_2$, $R_3$ and $R_4$ is hydrogen or lower alkyl providing that a sufficient number of $R_1$, $R_2$, $R_3$ and/or $R_4$ are lower alkyl in said polymeric backbone to render said backbone non-crystallizing; X is a divalent organic radical selected from $-CH_2-CH_2-$, $-CH_2-CH_2-CH_2-CH_2-$, $-CH_2-CH_2-S-CH_2-CH_2-$ or $-CH_2-CH_2-O-CH_2-CH_2-$; and n is 8 to 200.

75. A liquid polythioether according to claim 74 wherein a and b are 0.

76. A liquid polythioether according to claim 74 wherein b is 0 and a is 1.

77. A liquid polythioether according to claim 74 wherein the total number of $R_1$, $R_2$, $R_3$ and/or $R_4$ which are lower alkyl in said polymer backbone is at least the nearest whole number to the quotient of n/5.

78. A liquid polythioether according to claim 74 wherein the total number of $R_1$, $R_2$, $R_3$ and/or $R_4$ which are lower alkyl in said polymeric backbone is at least the nearest whole number to the quotient of n/4.

79. A liquid polythioether according to claim 74 wherein at least one of $R_1$ or $R_4$ is lower alkyl and each of $R_2$ and $R_3$ is hydrogen.

80. A liquid polythioether according to claims 77, 78 and 79 wherein lower alkyl is methyl.

81. A liquid polythioether according to claim 74 wherein p is 0.

82. A liquid polythioether according to claim 74 wherein said terminating radical is chemically non-reactive.

83. A liquid polythioether according to claim 74 wherein said chemically non-reactive radical is selected from the group consisting of aromatic, alkyl, heteroalkyl, alicyclic and heteroalicyclic.

84. A liquid polythioether according to claim 82 wherein the number of carbon atoms in said terminal chemically non-reactive radical does not exceed ten.

85. A liquid polythioether according to claim 82 wherein said terminating chemically non-reactive radical is thioalicyclic or oxyalicyclic.

86. A liquid polythioether according to claim 82 wherein said terminating chemically non-reactive radical is aromatic.

87. A liquid polythioether according to claim 82 wherein said terminating chemically non-reactive radical is heteroalkyl.

88. A liquid polythioether according to claim 82 wherein said terminating chemically non-reactive radical is alkyl.

89. A liquid polythioether according to claim 87 wherein said heteralkyl is selected from the group consisting of thioalkyl and oxyalkyl.

90. A liquid polythioether according to claim 74

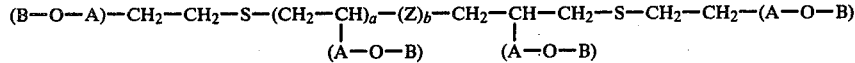

wherein Z is hetero(lower) aliphatic; B is a terminating radical which does not substantially reduce the water, solvent, and fuel resistance; A is a polymeric backbone consisting of repeating units of the formula wherein said terminating radical is vulcanizable.

91. A liquid polythioether according to claim 90 wherein said vulcanizable radical is selected from the group consisting of epoxide, reactive silyl, isocyanate, reactive olefinic double bond, mercaptan and hydrogen of a hydroxyl group.

92. A liquid polythioether according to claim 90 wherein the vulcanizable radical is epoxide.

93. A liquid polythioether according to claim 90 wherein the vulcanizable radical is reactive silyl.

94. A liquid polythioether according to claim 90 wherein the vulcanizable radical is isocyanate.

95. A liquid polythioether according to claim 90 wherein the vulcanizable radical is mercaptan.

96. A liquid polythioether according to claim 90 wherein the vulcanizable radical is the hydrogen of a hydroxyl group.

97. A liquid polythioether according to claim 74 wherein Z is oxy(lower) aliphatic.

98. The solid vulcanized elastomeric polythioether of the liquid polythioether of claim 18.

99. The solid vulcanized elastomeric polythioether of the liquid polythioether of claim 44.

100. The solid vulcanized elastomeric polythioether of the liquid polythioether of claim 67.

101. The solid vulcanized elastomeric polythioether of the liquid polythioether of claim 90.

* * * * *

UNITED STATES PATENT AND TRADEMARK OFFICE
CERTIFICATE OF CORRECTION

PATENT NO. : 4,366,307
DATED : December 28, 1982
INVENTOR(S) : Hakam Singh, Jack W. Hutt, and Morris E. Williams It is certified that error appears in the above-identified patent and that said Letters Patent are hereby corrected as shown below:

In column 6, lines 11 and 12 the spelling of the word "phosphorus" should be --phosphorous--.

In column 8, line 10 in the formula the first ($C_3$) should be --($CH_3$)--.

In column 8, line 14 the "Ti" is extra and the formula is in large bold type, it should be in the same size type as the formulas above it.

In column 9, line 19 the word "Vulcanizable" should be --vulcanizable--.

In column 19, Example 23, line 43 the word "Hydoxyl" should be "Hydroxyl".

In claim 89, the second line, the word "heteralkyl" should be --heteroalkyl--.

Signed and Sealed this

Fifth Day of July 1983

[SEAL]

Attest:

Attesting Officer

GERALD J. MOSSINGHOFF
Commissioner of Patents and Trademarks